Oct. 25, 1955 G. D. MATEER Re. 24,079
SCREW ACTUATED HOPPER FEEDER
Original Filed Jan. 24, 1950 2 Sheets-Sheet 1
Fig. 1.
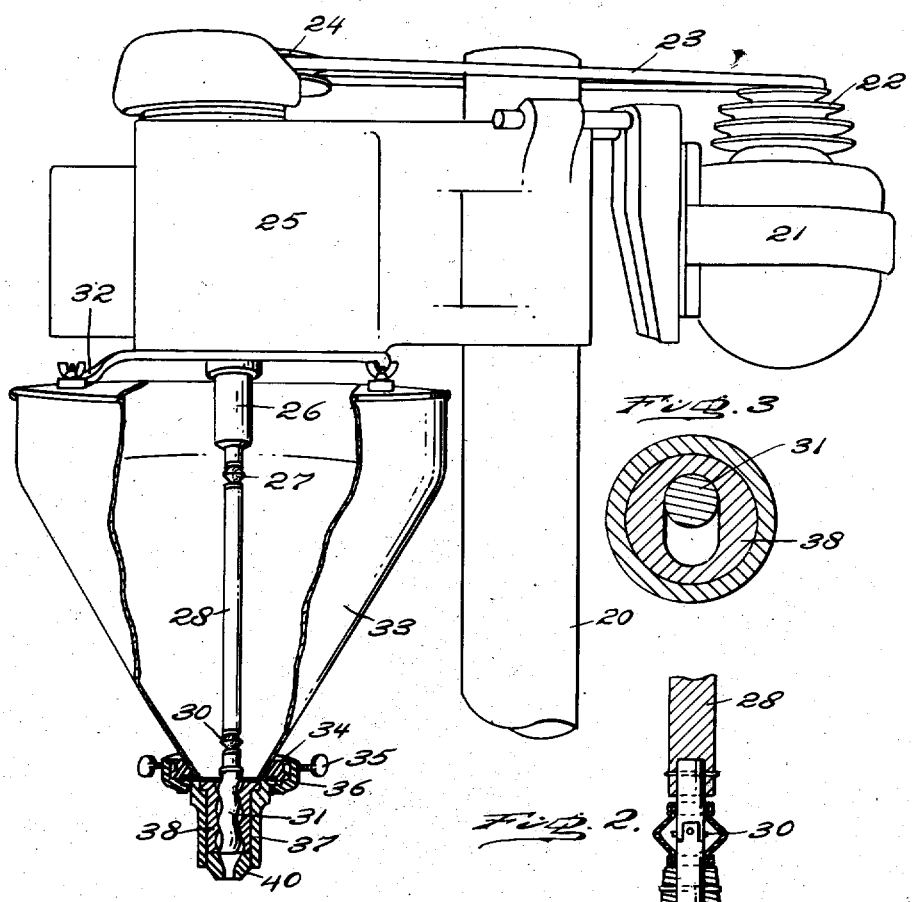
Fig. 3
Fig. 2.
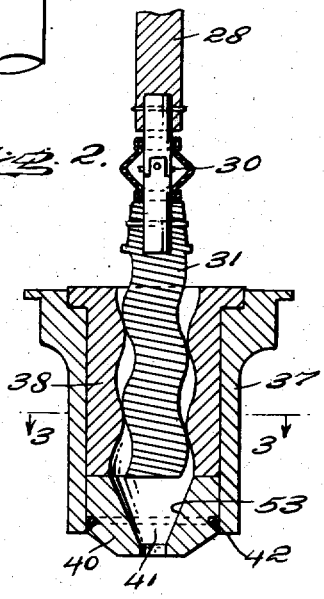
Fig. 8.
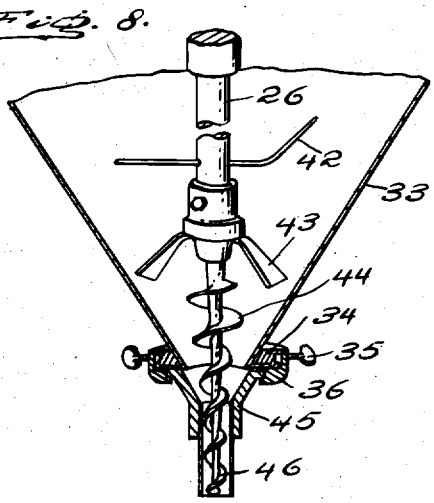
INVENTOR
George Diehl Mateer.
BY
ATTORNEYS.

Oct. 25, 1955 G. D. MATEER Re. 24,079

SCREW ACTUATED HOPPER FEEDER

Original Filed Jan. 24, 1950 2 Sheets-Sheet 2

INVENTOR
George Diehl Mateer.
BY
ATTORNEYS.

United States Patent Office

Re. 24,079
Reissued Oct. 25, 1955

24,079

SCREW ACTUATED HOPPER FEEDER

George Diehl Mateer, Villanova, Pa., assignor to G. Diehl Mateer Co., Devon, Pa., a corporation of Pennsylvania Original No. 2,686,618, dated August 17, 1954, Serial No. 140,200, January 24, 1950. Application for reissue December 29, 1954, Serial No. 478,557

8 Claims. (Cl. 222—378)

Matter enclosed in heavy brackets [ ] appears in the original patent but forms no part of this reissue specification; matter printed in italics indicates the additions made by reissue.

The present invention relates to hopper feeders of the type especially suited to accurate dispensing of highly viscous and plastic materials such as paste, putties, thick dispersions and plastic masses.

A purpose of the invention is to secure precise and accurate dispensing of highly viscous materials, avoiding premature cut off and avoiding appreciable overfeeding.

A further purpose is to simplify the cleaning and maintenance of hopper dispensers for viscous materials.

A further purpose is to obtain positive feed of highly viscous materials from the hopper itself without the use of a separate pump.

A further purpose is to make the hopper interchangeable with other types of feeders such as auger feeders.

A further purpose is to dispense viscous materials at high temperatures.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is a fragmentary perspective partially in vertical axial section showing the hopper feeder of the invention.

Figure 2 is a fragmentary enlarged axial section of the discharge end of the hopper.

Figure 3 is a section of Figure 2 on the line 3—3, with the rotor turned to contact the back of the stator.

Figures 4, 5, 6, 7, 9:
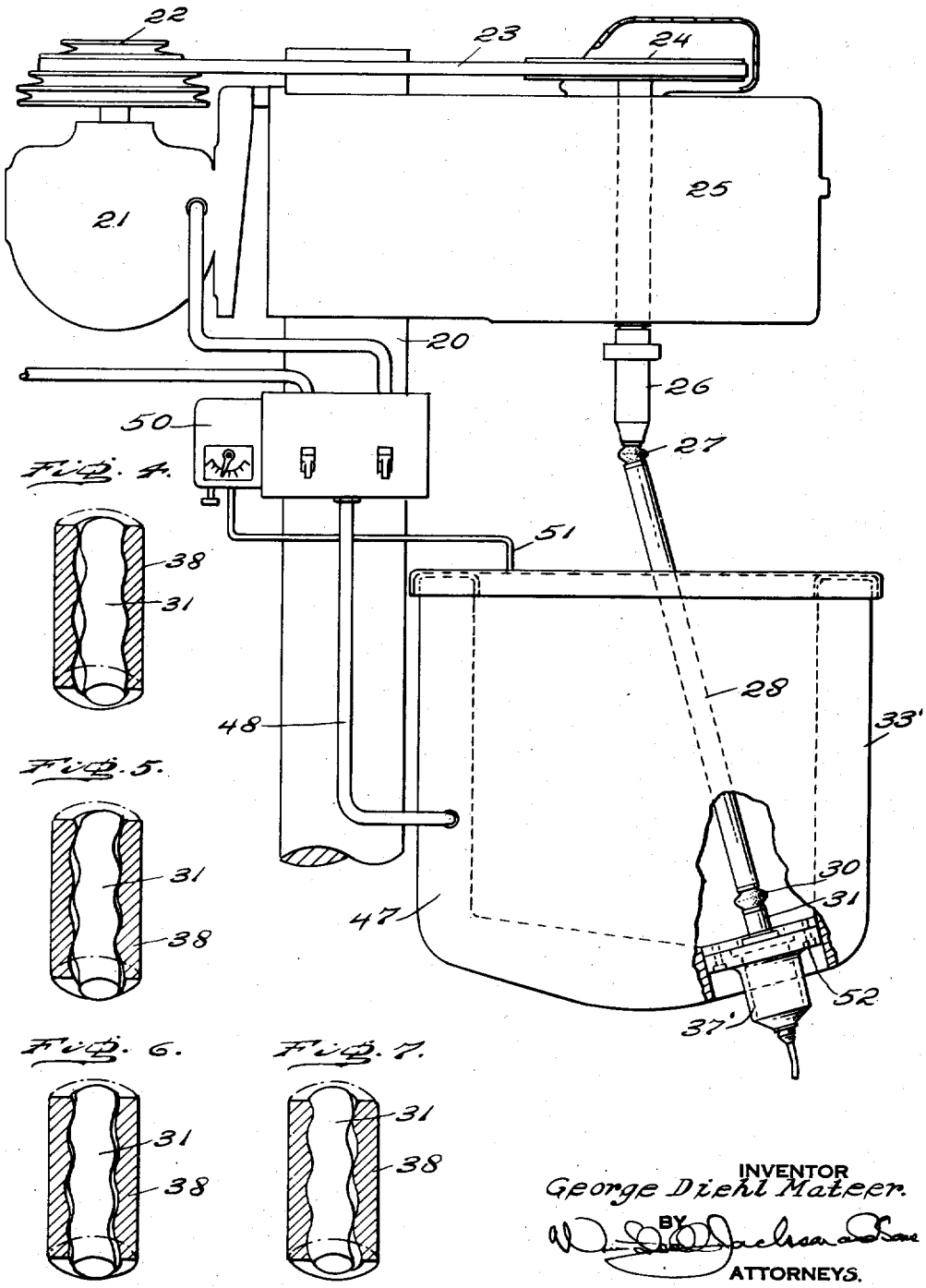

Figures 4 to 7 inclusive are diagrammatic sectional perspectives showing the operation of the rotor in the stator.

Figure 8 is an enlarged fragmentary axial section corresponding to a portion of Figure 1 showing the replacement of the screw feeder by an auger feeder.

Figure 9 is a fragmentary elevation, partly in axial section, showing the feeder of the invention applied to a heated vessel at elevated temperatures.

In the drawings like numerals refer to like parts.

Describing in illustration but not in limitation and referring to the drawings:

The accurate feeding of high viscosity masses has proved to be difficult, not only because many feeders are incapable of operating on such materials, but also because the accuracy of feeding usually decreases markedly as the viscosity of the material fed increases, and the problems of maintenance, especially cleaning, are correspondingly increased.

The present invention makes it possible to obtain very accurate feeding of pastes, putties, viscous dispersions and plastic masses, both at room temperature and at subnormal and elevated temperatures. Thus the invention is applicable to pasty masses of chemicals, foods, metallic salts, metals at elevated temperatures, thermoplastic materials in plastic condition, and the like.

The invention employs a screw feeder which gives positive engagement, after the manner of U. S. Patent No. 1,892,217, but avoids the difficulty and complexity present in prior art devices of this character in which the drive shaft has passed longitudinally through the rotor and been connected to the rotor at the far end. Instead of providing remote location of the pump, the pump is incorporated in the hopper and driven through the hopper, and discharge is effected immediately at the bottom of the screw, so that there is little or no opportunity for accumulation of any mass of material which can cause overfeeding. The shaft directly connects to the rotor by a universal joint at the top of the rotor, and it is wholly unnecessary in the device of the invention to conduct the shaft through the rotor.

The invention will find its best application to feeders of the character described and claimed in my copending application Serial No. 69,345, filed January 5, 1949, now Patent No. 2,641,384, issued June 9, 1953, for Universal Filler and incorporated herein by reference.

No attempt will be made to describe the clutch or other means by which the desired cycle or intermittency of the drive is accomplished. It will be sufficient to point out that in the forms of both Figures 1 and 9 a pedestal 20 supports an electric motor 21 which drives a variable speed pulley 22, interconnecting by a belt 23 with a driven pulley 24 which interconnects through a suitable clutch mechanism 25 with a main driven shaft 26.

The driven shaft 26 interconnects through an upper universal joint 27 with an intermediate driven shaft 28 which at its lower end connects by a lower universal joint 30 with a screw rotor 31 which turns and laterally oscillates on an essentially vertical axis.

The bottom of the clutch mechanism in Figure 1 carries a bracket 32 which removably supports a downwardly converging hopper 33 which contains the viscous material being fed. The hopper 33 at its lower end and desirably just below the universal joint 30 carries a mounting ring 34 which removably interconnects by thumb screws 35 with a surrounding collar 36 which supports a stator housing 37. Inside the stator housing is mounted a double internal screw stator 38 which cooperates with the single screw rotor. Immediately below the stator and immediately below the lower end of the rotor is a short discharge nozzle 40 having an extremely short discharge opening 41 and suitably removably held in place by a spring locking ring 42 which engages notches not shown in the stator housing.

The construction of the rotor and stator will be best understood by reference to Figures 2 to 7. The stator is a double internal helical thread each half of which in cross section as seen in Figure 3 is semicircular. All transverse sections of the thread are the same except in angle and correspond to Figure 3. The rotor is of a circular cross section as shown in Figure 3 and the diameter of the circle of the rotor cross section is substantially identical with the diameter of the semicircle at the ends of the cross section of the stator. As viewed in Figure 3 the distance between the longitudinal axis of the stator and the center of the cross section of the rotor when the rotor is in its limiting position as shown in Figure 3 is equal to twice the eccentricity of the rotor.

As seen in Figures 4, 5, 6 and 7, if the rotor is turning counterclockwise when viewed from the top, it will progressively exert a wedging action downward or exert a downward pumping action. The line of contact between the stator and the rotor, which appears at the right hand side of the rotor in Figure 4 moves progressively around the rotor and is at the left hand side of the rotor in Figure 7.

Thus the rotor goes through a compound movement consisting of rotation about its axis and eccentric action caused by its contact with the contour of the stator which makes its axis travel in a circular path corresponding with the eccentric.

If it is desired to replace the discharge device of Figures 1 to 7 by an auger feeder, the same hopper and clutch mechanism can be used as shown in Figure 8. In this case the driven shaft 26 carries a stirrer 42, a propeller 43 and an auger discharge 44 which extends through a discharge housing 45 and discharge port 46 mounted on a substitute collar 36.

In some cases it is desired to control the temperature of the material being fed. Figure 9 shows a device similar to that of Figures 1 to 7 inclusive, in which the hopper 33 is replaced by a pot 33' having a jacket 47 heated as by electrical resistor 48 controlled at 50. A thermocouple or other temperature controller 51 desirably extends into the pot. The stator and rotor in this form are conveniently identical with that of Figures 1 to 7 except that the stator housing 37' is suitably fastened as by bolting at 52 in the bottom of the pot and is desirably mounted eccentrically at a low point of the pot, suitably near one corner.

The taper of the discharge nozzle is preferably made very abrupt at 53 so that a minimum of material will be contained in the discharge nozzle interior. This has the advantage that there is very little material which can overfeed and also very little material which must be removed in cleaning.

In operation the hopper will be filled and the drive shaft will operate on any suitable intermittent cycle to feed at the required intervals as determined by the clutch 25. When the drive shaft turns, the contact of the helix of the rotor with the double helical threads of the stator will cause any given cross section of the rotor as that of Figure 3 to move laterally back and forth across the stator cross section, exerting a forward wedging action on the material to be fed. As the rotor thus moves eccentrically the universal joints maintain driving connection. There is no possibility of the material being pumped into the interior of the rotor or clogging the same, since the driving shaft does not pass through the rotor. The rotor is conveniently solid or at least closed so that the material fed cannot enter the interior of the rotor.

It is thus possible to secure very reliable feeding notwithstanding that the materials fed may be reaction mixtures, or gritty or abrasive or highly viscous fluids or plastics.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a dispenser apparatus for dispensing accurate quantities of viscous plastic material contained therein, a hopper having downwardly converging side walls forming a funnel to provide continuous and even flow of material downwardly in said hopper to its lowermost discharge end portion, a discharge opening in said lowermost portion of said hopper, a ring mounted on said lowermost hopper portion, a collar removably secured to said ring, a housing supported by said collar and communicating with said discharge opening, a rotor and metal stator mechanism arranged in said housing which is operable for accurately controlling the discharge of said plastic material whereby accumulation of material and overfeeding is avoided, said mechanism consisting of a double screw stator which cooperates with a single screw rotor, a *tapered* nozzle disposed in the lower end of said [casing] *housing* and communicating with the lower end of said [casing and communicating with the lower end of said] stator and rotor mechanism, *the taper of said nozzle being abrupt so that a minimum of material will be contained in the area defined by the nozzle,* a drive shaft extending vertically into said hopper, an intermediate driven shaft connected to said drive shaft, universal joint connections disposed at opposite ends of said intermediate shaft, said last-mentioned shaft being connected at its upper end through the universal joint to said drive shaft and at its lower end to *the upper end of* said screw rotor, and means for removably securing said collar supporting said housing to said ring mounted on said hopper, said screw rotor being rotatable on its vertical axis through its universal connection with said intermediate shaft to exert a progressive wedging action downwardly whereby accurate increment amounts of said plastic material are withdrawn from said hopper and delivered to said nozzle.

2. In a dispenser apparatus for dispensing accurate quantities of viscous plastic material contained therein, a hopper having downwardly converging side walls forming a funnel to provide continuous and even flow of material downwardly in said hopper to its lowermost discharge end portion, a discharge opening in said lowermost portion of said hopper, a ring mounted on said lowermost hopper portion, a collar removably secured to said ring, a housing supported by said collar and communicating with said discharge opening, a rotor and stator mechanism arranged in said housing which is operable for accurately controlling the discharge of said plastic material whereby accumulation of material and over-feeding is avoided, said mechanism consisting of a double screw stator which cooperates with a single screw rotor, a nozzle disposed in the lower end of said [casing] *housing* and communicating with the lower end of said stator and rotor mechanism, said nozzle having an internal tapered wall structure whereby a minimum amount of material is contained therein to prevent overfeeding of material from the nozzle, a drive shaft extending vertically into said hopper, an intermediate driven shaft connected to said drive shaft, universal joint connections disposed at opposite ends of said intermediate shaft, said last-mentioned shaft being connected at its upper end through the universal joint to said drive shaft and at its lower end to *the upper end of* said screw rotor, and means for removably securing said collar supporting said housing to said ring mounted on said hopper, said screw rotor being rotatable on its vertical axis through its universal connection with said intermediate shaft to exert a progressive wedging action downwardly whereby accurate increment amounts of said plastic material are withdrawn from said hopper and delivered to said nozzle.

*3. In a dispenser apparatus for dispensing accurate quantities of viscous plastic material, said dispensing apparatus including a hopper for containing a quantity of material to be dispensed, said hopper being orificed in its lower area, and a rotatable driving shaft projecting downwardly into said hopper, a double screw stator unit, said unit being attached to the bottom of the hopper to communicate with the hopper orifice and extending therefrom in a direction having a substantial downward component, said stator defining a helical passage, a tapered nozzle secured to the lowermost extremity of said stator unit to receive material being discharged through said passage, the taper of said nozzle being abrupt so that a minimum of material will be contained in the area defined by the nozzle, a single screw rotor, said rotor fitting closely, but being adapted to rotate, within said stator unit, said rotor helix extending through said stator to its lowermost extremity adjacent the nozzle, and an intermediate shaft, said shaft being movably connected at one extremity by universal joint to the lowermost end of the said driving shaft, and at its other extremity, to the upper end of the said rotor whereby rotation of the driving shaft in the direction of the thread of the rotor screw effects a suction of the material from the hopper into the interstices between the rotor and stator unit, and*

*its ultimate ejection through the nozzle in quantities directly proportional to the number of revolutions made by the rotor.*

*4. In a dispenser apparatus for dispensing accurate quantities of viscous plastic material, said dispensing apparatus including a hopper for containing a quantity of material to be dispensed, said hopper having downwardly converging sidewalls forming a funnel to provide continuous and even flow of material downwardly in said hopper and said hopper further being orificed in its lowermost area, and a rotatable driving shaft projecting downwardly into said hopper, a double screw stator unit, said unit being attached to the bottom of the hopper to communicate with the hopper orifice and extending therefrom in a direction having a substantial downward component, said stator defining a helical passage, a tapered nozzle secured to the lowermost extremity of said stator unit to receive material being discharged through said passage, the taper of said nozzle being abrupt so that a minimum of material will be contained in the area defined by the nozzle, a single screw rotor, said rotor fitting closely, but being adapted to rotate, within said stator unit, said rotor helix extending through said stator to its lowermost extremity adjacent the nozzle, and an intermediate shaft, said shaft being movably connected at one extremity by universal joint to the lowermost end of the said driving shaft, and at its other extremity, to the upper end of the said rotor whereby rotation of the driving shaft in the direction of the thread of the rotor screw effects a suction of the material from the hopper into the interstices between the rotor and stator unit, and its ultimate ejection through the nozzle in quantities directly proportional to the number of revolutions made by the rotor.*

*5. In a dispenser apparatus for dispensing accurate quantities of liquid or plastic material, said dispensing apparatus including a hopper for containing a quantity of the material to be dispensed, said hopper being orificed in its lower area, and rotatable drive means, said means extending in the direction of the area contained by the walls of the hopper, a double screw stator unit, said unit being attached to the bottom of the hopper to communicate with the hopper orifice and extending therefrom in a direction having a substantial downward component, said stator defining a helical passage, a tapered nozzle secured to the lowermost extremity of said stator unit to receive material being discharged through said passage, the taper of said nozzle being abrupt so that a minimum of material will be contained in the area defined by the nozzle, a single screw rotor, said rotor fitting closely, but being adapted to rotate within said stator unit, the said rotor helix extending through said stator to its lowermost extremity adjacent the nozzle, and a shaft, said shaft being rotatably connected at one extremity by a universal joint to the rotatable drive means and, at its other extremity, to the upper end of the said rotor whereby rotation of the shaft in the direction of the thread of the rotor screw effects a suction of the material from the hopper into the interstices between the rotor and stator unit, and its ultimate ejection through the nozzle in quantities directly proportional to the number of revolutions made by the rotor.*

*6. Apparatus adapted to fill liquid or powders in predetermined increment quantities and with accuracy into a container, said apparatus comprising a hopper, said hopper having an orifice in its lowermost area, a rotatable driving shaft projecting downwardly into said hopper, means for rotating said shaft, coupling means adapted for detachably securing to said hopper a housing having flange means for mounting an auger or a Moyno pump, means comprising an intermediate shaft vertically disposed in said hopper operatively connected to said driving shaft and adapted to actuate said auger or pump, said coupling means comprising a collar attached to said hopper and arranged adjacent to said hopper orifice, a mounting ring overlying said collar, means for detachably securing said ring to said collar, and flange means on said ring for cooperation with said flange means on said housing for securing the housing to the coupling means.*

*7. Apparatus adapted to fill powders in predetermined increment quantities and with accuracy into a container, said apparatus comprising a hopper, said hopper having an orifice in its lowermost area, a rotatable driving shaft projecting downwardly into said hopper, means for rotating said shaft, coupling means for detachably securing to said hopper a housing having flange means for mounting an auger, means comprising an intermediate shaft vertically disposed in said hopper operably connected to said driving shaft and adapted for connection with said auger for actuating the same, said coupling means comprising a collar attached to the hopper and arranged adjacent to said hopper orifice, a mounting ring overlying said collar, means for detachably securing said ring to said collar, and flange means on said ring for cooperation with said flange means on said housing for securing the housing to the coupling means.*

*8. Apparatus adapted to fill liquid in predetermined increment quantities and with accuracy into a container, said apparatus comprising a hopper, said hopper having an orifice in its lowermost area, a rotatable driving shaft projecting downwardly into said hopper, means for rotating said shaft, coupling means for detachably securing to said hopper a housing having flange means for mounting a Moyno pump, means comprising an intermediate shaft vertically disposed in said hopper operably connected to said driving shaft and adapted for connection with said Moyno pump for actuating the same, said coupling means comprising a collar attached to the hopper and arranged adjacent to said hopper orifice, a mounting ring overlying said collar, means for detachably securing said ring to said collar, and flange means on said ring for cooperation with said flange means on said housing for securing the housing to the coupling means.*

References Cited in the file of this patent or the original patent

UNITED STATES PATENTS

| | | |
|---|---|---|
| 551,852 | Desgoffe | Dec. 24, 1895 |
| 1,113,381 | Thoma | Oct. 13, 1914 |
| 1,282,318 | Thull | Oct. 22, 1918 |
| 1,499,338 | Bond | July 1, 1924 |
| 1,611,800 | Ziegner | Dec. 21, 1926 |
| 1,658,247 | Lower et al. | Feb. 7, 1928 |
| 1,751,624 | Du Brul | Mar. 25, 1930 |
| 1,752,956 | Lex | Apr. 1, 1930 |
| 1,892,217 | Moineau | Dec. 27, 1932 |
| 2,369,359 | MacWilliam et al. | Feb. 13, 1945 |
| 2,525,256 | Byram | Oct. 10, 1950 |
| 2,525,973 | Sundstrom et al. | Oct. 17, 1950 |